United States Patent
Allison

(10) Patent No.: US 9,177,166 B2
(45) Date of Patent: Nov. 3, 2015

(54) SYSTEM AND METHOD FOR AUTHENTICATION

(71) Applicant: Systel Business Equipment Co., Inc., Fayetteville, NC (US)

(72) Inventor: Dennis Keith Allison, Ft. Bragg, NC (US)

(73) Assignee: Systel Business Equipment Co., Inc., Fayetteville, NC (US)

( * ) Notice: Subject to any disclaimer, the term of this patent is extended or adjusted under 35 U.S.C. 154(b) by 0 days.

(21) Appl. No.: 14/464,278

(22) Filed: Aug. 20, 2014

(65) Prior Publication Data

US 2015/0055161 A1    Feb. 26, 2015

Related U.S. Application Data

(60) Provisional application No. 61/868,413, filed on Aug. 21, 2013.

(51) Int. Cl.
G06F 21/60 (2013.01)
G06F 21/33 (2013.01)

(52) U.S. Cl.
CPC ............ *G06F 21/608* (2013.01); *G06F 21/335* (2013.01)

(58) Field of Classification Search
USPC ........................................ 358/1.13
See application file for complete search history.

(56) References Cited

U.S. PATENT DOCUMENTS

2009/0077217 A1* 3/2009 McFarland et al. ........... 709/223
2011/0013224 A1* 1/2011 Uchida ....................... 358/1.15

* cited by examiner

*Primary Examiner* — Ngon Nguyen
(74) *Attorney, Agent, or Firm* — Coats & Bennett, PLLC

(57) ABSTRACT

A multi-functional device is attached to a secure network and includes a control circuit. The control circuit receives indications as to whether a user is authenticated to use the multi-functional device and in response, generates and sends a control signal to the multi-functional device. As long as the multi-functional device continues to receive the control signal, the multi-functional device remains in an operational mode to allow the authenticated user to access the multi-functional device functions. If the multi-functional device ceases to receive the control signal, the multi-functional device deactivates itself.

16 Claims, 10 Drawing Sheets

SYSTEM AND METHOD FOR AUTHENTICATION

CROSS REFERENCE TO RELATED APPLICATIONS

This application claims the benefit of priority from U.S. Provisional Application Ser. No. 61/868,413 entitled "System and Method for Authentication" and filed Aug. 21, 2013, the contents of which is incorporated herein by reference in its entirety.

FIELD OF THE INVENTION

The present disclosure relates generally to systems and methods for authenticating users, and more particularly, to systems and methods for authenticating users over a secure network to facilitate the utilization of devices connected to the secure network.

BACKGROUND

There are many different entities that utilize multi-functional devices (MFDs) connected to a secure network. For example, consider a government agency that utilizes photocopier devices, scanning devices, printers, computing devices, and the like, connected to the secure network. In operation, user may employ these MFDs, and others like them, to create, copy, and disseminate classified information. However, due to the sensitive nature of the information, the MFDs are generally placed into secure areas, rooms, or vaults, for example, to limit their access to unauthorized users. Often times, however, such positioning is not optimal. For example, buildings and/or rooms may need to be renovated to ensure the security of these devices, as well as to efficiently limit access to only authorized users. In many cases, the renovation costs to facilitate such restrictions are substantial.

SUMMARY

The present disclosure provides a system, device, and method for authenticating users, over a secure network, to use multi-functional devices (MFDs) communicatively connected to the secure network. In one embodiment, an MFD comprises a user input/output (I/O) assembly configured to receive user input. The user input, which may comprise user credentials and an associated password or Personal Identity Number (PIN), are provided to a server via a secure network. If the information is authenticated, a heartbeat signal is generated and sent to access control circuitry. Upon receipt, the access control circuitry generates a control signal and provides it to the MFD. The control signal opens the MFD so that the authenticated user can utilize the functions provided by the MFD. So long as the access control circuitry receives a heartbeat signal, the access control circuitry will generate the control signal for the MFD. However, upon detecting that the heartbeat signal has ceased, the access control circuitry will cease generating the control signal thereby disabling MFD.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present disclosure provides a system, device, and method for authenticating users, over a secure network, to use multi-functional devices (MFDs) that are communicatively connected to the secure network. Conventionally, such MFDs are placed in vaults or other secure or restricted areas to limit access to the MFDs by unauthorized users. However, these conventional methods of limiting access to MFDs connected to a secure network are not always optimal. Particularly, installing or moving such MFDs into restricted areas can be expensive, time consuming, and cumbersome. And, where a suitable building, room, or vault does not exist, the building, room, or vault, must be renovated or built to ensure security. The costs associated with such renovations can be expensive. Therefore, aspects of the present disclosure provide a system, device, and method that allow an MFD connected to a secure network to remain in an unsecured or unrestricted area while ensuring that only authorized users can access the functions of the MFD.

Figure 1:
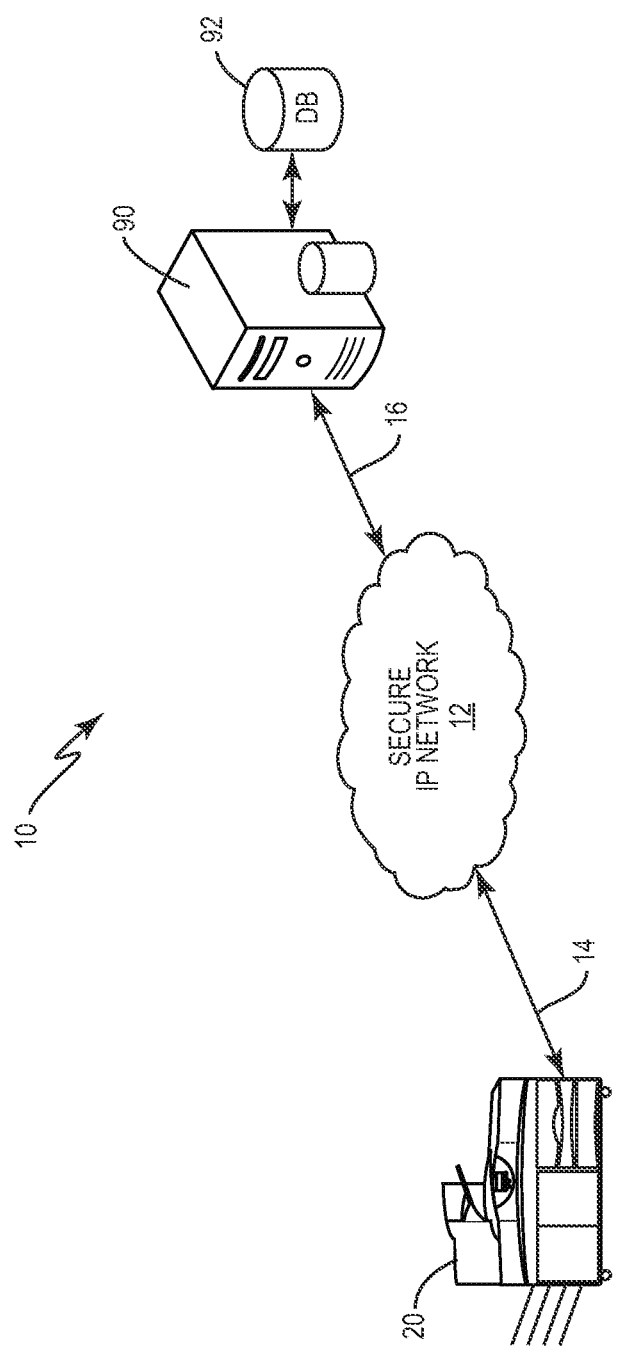
FIG. 1 is a block diagram illustrating some components of a communication system according to one embodiment.

Turning to the drawings, FIG. 1 illustrates a communication system 10 configured according to one embodiment of the present disclosure. As seen in FIG. 1, system 10 comprises an IP network 12 communicatively connecting a multi-functional device (MFD) 20 to one or more secure servers 90 via communication links 14 and 16. In this embodiment, the IP network 12 is an Ethernet network that facilitates the communication of data packets and other information between the MFD 20 and secure server 90 utilizing the well-known TCP/IP protocol. Thus, the components of system 10 may be communicatively connected using red Ethernet cables, such as category 5e or 6 Ethernet cables having RJ-45 connecters. The use of red Ethernet cables, as is known in the art, functions as a visual aid to indicate that classified information is being transmitted and/or processed. However, those of ordinary skill in the art will appreciate that other types of networks and protocols may be used in addition to, or in lieu of, IP network 12, as needed or desired. For example, in one embodiment, a device such as MFD 20 may access the secure IP network 12 via an intervening access network (AN) that uses wireless technology to communicate with the device.

The MFD 20, as seen in FIG. 1, comprises a photocopier device capable of optically scanning and printing documents. However, it should be noted that this is for illustrative purposes only. MFD 20 may comprise any type of device that is capable of connecting to, and communicating over, IP network 12. Such devices include, but are not limited to, computing devices such as desktop and laptop computers, server computing devices, gateway devices, facsimile machines, telephones, printers, and the like.

Secure server 90 may comprise any server known in the art, but in one embodiment, comprises an application server (AS) operatively connected to a database 92. The secure server 90 may perform many different functions depending on the applications it executes. However, in at least one embodiment, secure server 90 receives request messages for data from MFD 20 via IP network 12. Upon receipt, the secure server 90 consults the database 92. If the requested data is found in database 92, the secure server 90 retrieves that data from the database 92, and provides that data to MFD 20 in one or more response messages via IP network 12. In one aspect, the messages communicated between MFD 20 and secure server 90 conform to the HyperText Transfer Protocol (HTTP); however, other protocols may be utilized as needed or desired so long as they support a request-response mechanism for obtaining data from server 90 and returning the data to MFD 20.

As previously stated, MFD 20, IP network 12, and server 90 are all secure. To help ensure that security, IP network 12 and/or MFD 20 may remain unconnected to any publically available or unsecured networks, such as the Internet, for example. Thus, the components of system 10 seen in FIG. 1 are capable of operating independently of other networks and devices.

However, in many cases, IP network 12 and/or MFD 20 will require a connection to network or device that is not capable of secure operation, or of supporting other networks and devices that are so capable. Thus, although not explicitly seen in the Figures, IP network 12 may comprise various hardware and software entities, such as gateways, firewalls, and the like, that are specially designed to restrict access to IP network 12. There are many different strategies for securing IP network 12, as well as the devices attached to it, such as MFD 20 and secure server 90. Some strategies, as described below in more detail, require users to provide information prior to gaining access to the IP network 12. Upon receipt, the information is checked for accuracy and used to determine whether the users that provided the information are eligible to access the IP network 12 from MFD 20.

For example, MFD 20 comprises a secure device (e.g., a photocopier) that is accessible only to authorized users or devices. In operation, MFD 20 may prompt a user to enter authentication information, such as a username and a password, for example, and provide that information to the secure server 90 via IP network 12. Upon receipt of the information, secure server 90 may perform a check of the information against the data stored in a database 92, for example, and render an authentication response to the MFD 20 based on the results of that check. A successful check would result in the user being authorized to access the functions of the MFD 20. An unsuccessful check, however, would result in the user being denied access to the functions of the MFD 20. Particularly, the MFD 20 could be configured to enter an operational mode in which only power is supplied to MFD 20, but none of its functions are operational. Therefore, continued attempts to access the functions of MFD 20 while it is in this mode are denied until a user provides information that is authenticated.

As stated previously, conventional methods for securing MFD 20 also required operators to physically position the MFD 20 well within a secure or limited access area, such as a specially designated building, room, or vault. However, this is not always optimal or possible, and the costs of ensuring secure positioning may be excessive. Therefore, in one or more embodiments, the present disclosure provides a system, device, and method for the MFD 20 that allows the MFD 20 to remain in a non-secure area while allowing only authorized users access to the functions of MFD 20.

Figure 2:
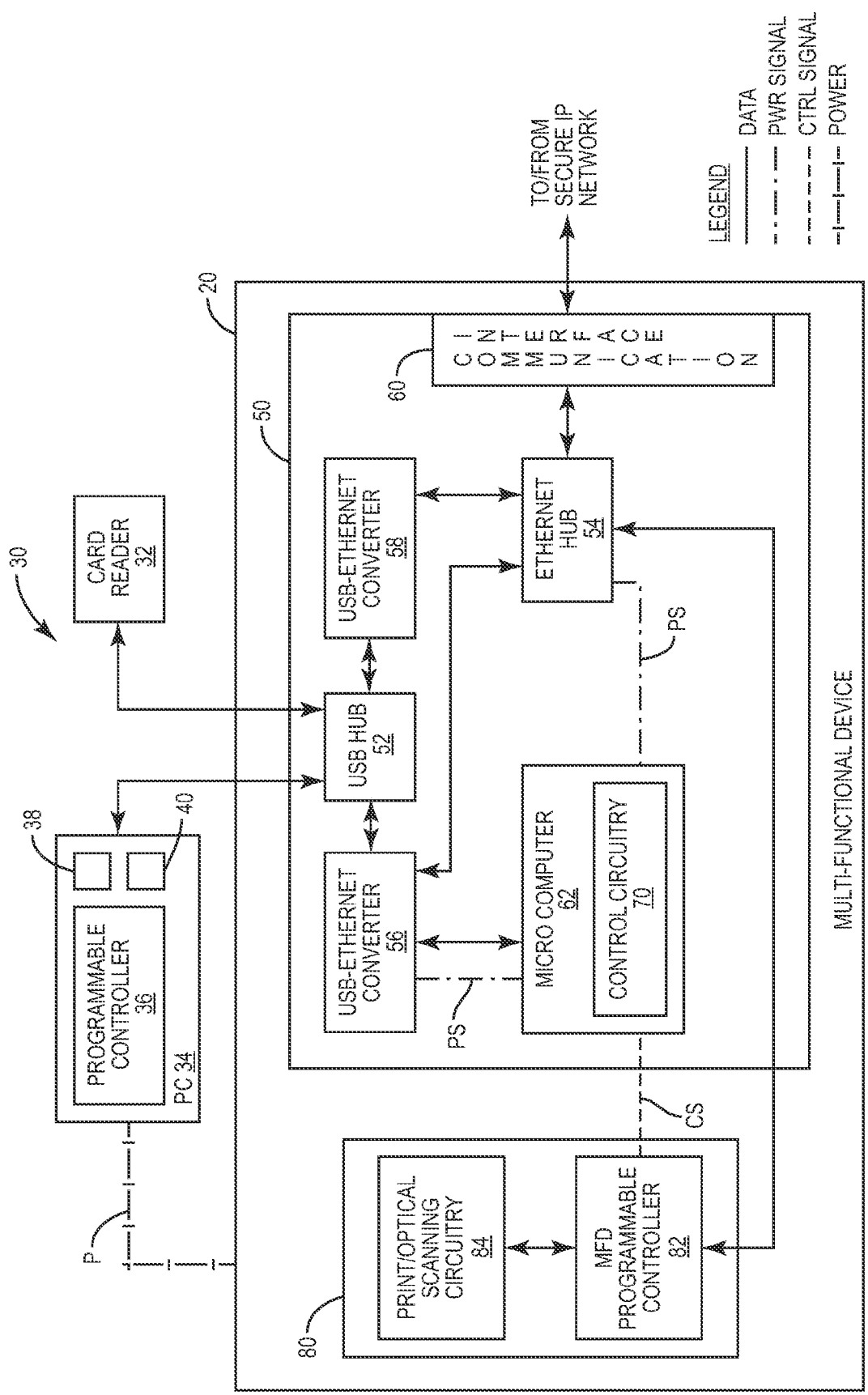
FIG. 2 is a block diagram illustrating some components of a multi-functional device (MFD) configured according to one embodiment communicatively connected to a secure IP network.

FIG. 2 is a block diagram illustrating components that enable MFD 20 to operate in a normal mode while located in an unrestricted or unsecured area according to one embodiment. As seen in FIG. 2, MFD 20 comprises a user input/output (I/O) assembly 30, a control device 50, and photocopier circuitry 80. In general, the user I/O assembly 30 functions to receive user credentials for authenticating the user, and in some embodiments, may output the results of the authentication attempts on a display to the user. The user I/O assembly 30 also generates and sends a periodic signal to the control device 50 for authenticated users. In response to this signal, the control device 50 generates a control signal that activates the photocopier circuitry 80 and maintains the photocopier circuitry 80 operating in a normal mode even though the MFD 20 may be physically positioned in an unrestricted area.

In more detail, the user I/O assembly 30 comprises a device for receiving user input, such as a card reader 32, and a computing device 34. These components communicate with each other to facilitate authenticating a user. Particularly, each authorized user of MFD 20 has an associated card medium. As is known in the art, the card medium includes a laminated magnetic strip that is encoded with information unique to the user (e.g., user credentials). To gain access to MFD 20, the user inserts the card into the card reader 32. Using well-known circuitry and software, the card reader 32 reads the encoded information from the magnetic strip, and communicates the encoded information to the computing device 34 where it is utilized to authenticate the user.

Computing device 34 may be any general purpose computing device, such as a tablet computer or laptop computer, for example, having an associated Operating System (OS) such as Microsoft Windows®. The OS provides, inter alia, the functions needed to authenticate the user with secure server 90 using the credentials received from card reader 32. Those of ordinary skill in the art should appreciate that while the disclosure identifies Microsoft Windows® specifically; neither the computing device 34 nor the embodiments of the present disclosure require Microsoft Windows®. Rather, other OSs, such as any of the flavors of Unix, Linux, and the like, may be used on computing device 34 in conjunction with any of the embodiments of the present disclosure.

Computing device 34 may, in one embodiment, receive its power directly from the MFD 20, such as from a 120-volt outlet, for example, via a power cable P. Computing device 34 comprises a programmable controller 36 that generally controls the operation and functions of the computing device 34 according to the appropriate standards. Programmable controller 36 may be implemented, for example, by one or more microprocessors, hardware, firmware, or a combination thereof, and is configured to execute a wide variety of user applications such as login application 38 and control application 40.

In one embodiment, login application 38 comprises an application provided by the underlying OS, and facilitates the login procedure for the user. In operation, the login application 38 receives the encoded user credential information from the card reader 32, and in at least some embodiments, a personal password or Personal Identification Number (PIN) input by the user. Upon receipt of this data, login application 38 communicates the encoded user credential and PIN information in an authentication request message to secure server 90 via IP network 12. The message may comprise, for example, a HyperText Transfer Protocol (HTTP) request message; however, those of ordinary skill in the art will appreciate that the present disclosure is not so limited, and that any known protocol and/or message may be used as needed or desired.

Login application 38 is additionally configured to receive the results of the authentication request from secure server 90. For example, in one embodiment, login application 38 receives an HTTP response message from secure server 90 indicating the success or failure of the authentication process. Provided authentication is successful, the login application 38 may generate an authentication success signal for a control application 40. If authentication fails, then no signal is generated, or alternatively, a fail signal is generated by login application 38 for control application 40.

The control application 40, as described later in more detail, comprises a script or other software module that, when executed by the programmable controller 36, monitors for the authentication success signal generated by the login application 38. Upon detecting the signal, control application 40 generates a heartbeat signal. This heartbeat signal is repeatedly generated and sent to the control device 50 (e.g., once every 500 milliseconds), as long as the user remains logged in and as long as the user's card remains inserted into the card reader 32. When the user logs out or removes the card medium from the card reader 32, or when some other predetermined event occurs, the control application 40 ceases to generate and send the heartbeat signal to the control device 50.

As described in more detail below, the heartbeat signal is repeatedly monitored by the control device 50. So long as the heartbeat signal is active, the control device 50 will ensure that the photocopier circuitry 80 of MFD 20 remains active. However, when control device 50 fails to receive the heartbeat signal, the control device 50 disables the photocopier circuitry 80 such that those functions are not usable or accessible by another user.

Control device 50 comprises a USB Hub 52, an Ethernet hub 54, a pair of USB-Ethernet converters 56, 58, a communications interface 60 and a microcomputer 62. In general, the control device 50 communicatively interconnects the user I/O assembly, the photocopier circuitry 80, and the secure server 90 via IP network 12, and controls the activation and deactivation of the photocopier circuitry 80 based on the receipt of the heartbeat signal, as described above.

In more detail, the USB Hub 52 and the Ethernet Hub 54 are multi-port hubs that interconnect the USB-based components of the user I/O assembly 30 with the Ethernet-based components of photocopier circuitry 80 and the IP network 12. In one embodiment, each hub 52, 54 comprises a 4-port hub, although those of ordinary skill in the art will appreciate that hubs having more or fewer ports may be used as needed or desired. Regardless of the number of ports, however, each hub 52, 54, receives the power it needs to function from the microcomputer 62. In one embodiment, for example, the microcomputer 62 outputs a 5-volt signal to each of the hubs 52, 54. However, those of ordinary skill in the art will appreciate that any desired voltage may be used. Further, the hubs 52, 54 are not limited to receiving power from the microcomputer 62 as one or both of the hubs 52, 54 may receive power from another source as needed or desired.

The USB-Ethernet converters 56, 58 are configured to convert signals and data back and forth between USB and Ethernet protocols. This allows USB-based components such as computing device 34 and card reader 32, to communicate data and signals with other Ethernet-based devices, such as secure server 12, via communications interface 60 and IP network 12. It should be noted that although two converters 56, 58 are illustrated in FIG. 2, the control device 50 may perform the same conversion functions using only a single USB-Ethernet converter if desired.

Microcomputer 62 may comprise, for example, any single-board computing device known in the art such as a Raspberry Pi® or similar device. Conventionally, such devices are built on a single printed circuit board (PCB) and include, inter alia, memory, an input/output interface to communicate with the controllers of other devices, and a microprocessor or controller, such as that included in access control circuitry 70. The microcomputer 62 has an associated OS that may be the same or different than the OS associated with the computing device 34.

In one or more embodiments, the access control circuitry 70 is configured to detect the heartbeat signal generated by the control application 40. For example, in one embodiment, the access control circuitry 70 polls a communication port over which data is received from the control application to receive the heartbeat signal. The poll interval may be any length desired, but in one embodiment, is 500 milliseconds in length. Thus, so long as the access control circuitry 70 continues to regularly detect the heartbeat signal, the access control circuitry 70 generates a control signal CS and delivers that control signal CS to the MFD controller 82. If the access control circuitry 70 ceases to receive the heartbeat signal for a predetermined time period (e.g., 2 seconds), or the access control circuitry 70 polls a predetermined number of times without receiving the expected heartbeat signal, the access control circuitry 70 ceases to generate the control signal CS, or alternatively, generates another fail signal for delivery to the MFD controller 82.

The MFD controller 82, which may comprise a microprocessor, for example, also has an associated OS that may be the same or different from one or both of the computing device 34 and the microcomputer 62. In operation, the MFD controller 20 controls the functions of the photocopier circuitry 80, such as those provided by the printing and scanning circuitry 84, for example, to allow the authorized user to use these functions. More specifically, receipt of the control signal CS at the MFD controller 82 activates the MFD controller 82 and the printing and scanning circuitry 84. Once activated, continued receipt of the control signal CS at the MFD controller 82 maintains the MFD 20 in an active state so that the authorized user is able to access and use the printing and scanning functions. If MFD controller 82 ceases to receive the control signal CS from access control circuitry 70, the MFD controller 82 deactivates the printing and scanning circuitry 84, as well as the other functions of MFD 20, so that the user can no longer utilize MFD 20. As stated above, the cessation of the control signal CS may be in response to detecting that the user has logged out of the system 10, or that the card medium has been removed from the card reader 32.

Figure 3:
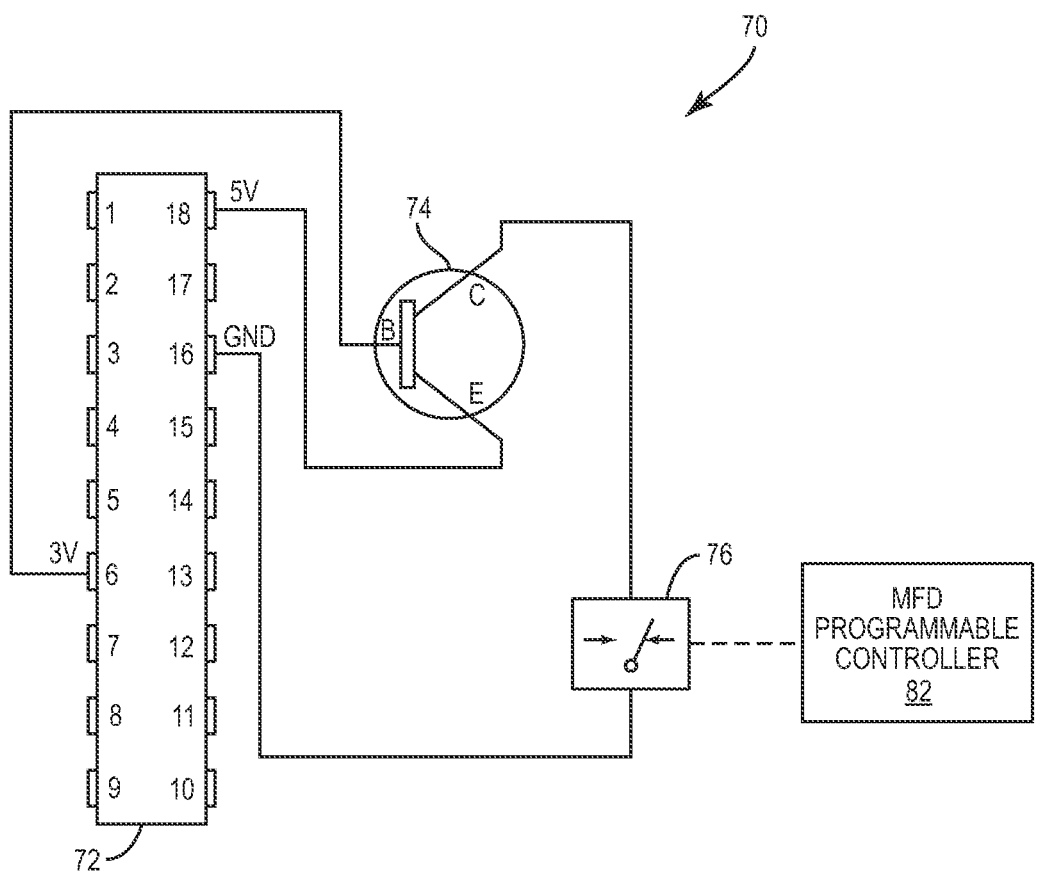
FIG. 3 is a block diagram illustrating access control circuitry for enabling and disabling the functions of the MFD according to one embodiment.

FIG. 3 is a circuit diagram illustrating the operation of the access control circuitry 70 in microcomputer 62 according to one embodiment. As seen in FIG. 3, the access control circuitry 70 comprises an access control processor 72, a transistor element 74, and a switch 76 that is electrically connected to the MFD controller 82. While the access control circuitry 70 receives the heartbeat signal, the access control processor 72 generates a pair of signals at specified DC voltages. A first 3-volt DC signal is generated at pin 6 and applied to the base B of transistor element 74, while a second 5-volt DC signal is generated at pin 18 and applied to the emitter E of transistor element 74. These voltages activate the transistor element 74 such that 5-volts DC is output on the collector C of transistor element 74. The 5-volts DC output from the collector C is then supplied to a first side of switch 76. This closes the switch 76 such that the signal is supplied to the MFD controller 82 as the control signal CS. If the control processor 72 no longer detects the heartbeat signal, the access control processor 72 ceases to generate the first 3-volt DC signal output on pin 6. The absence of this signal opens the switch 76 thereby causing the access control circuitry 70 to cease sending the control signal CS to MFD controller 82, as previously described.

Figure 4A:
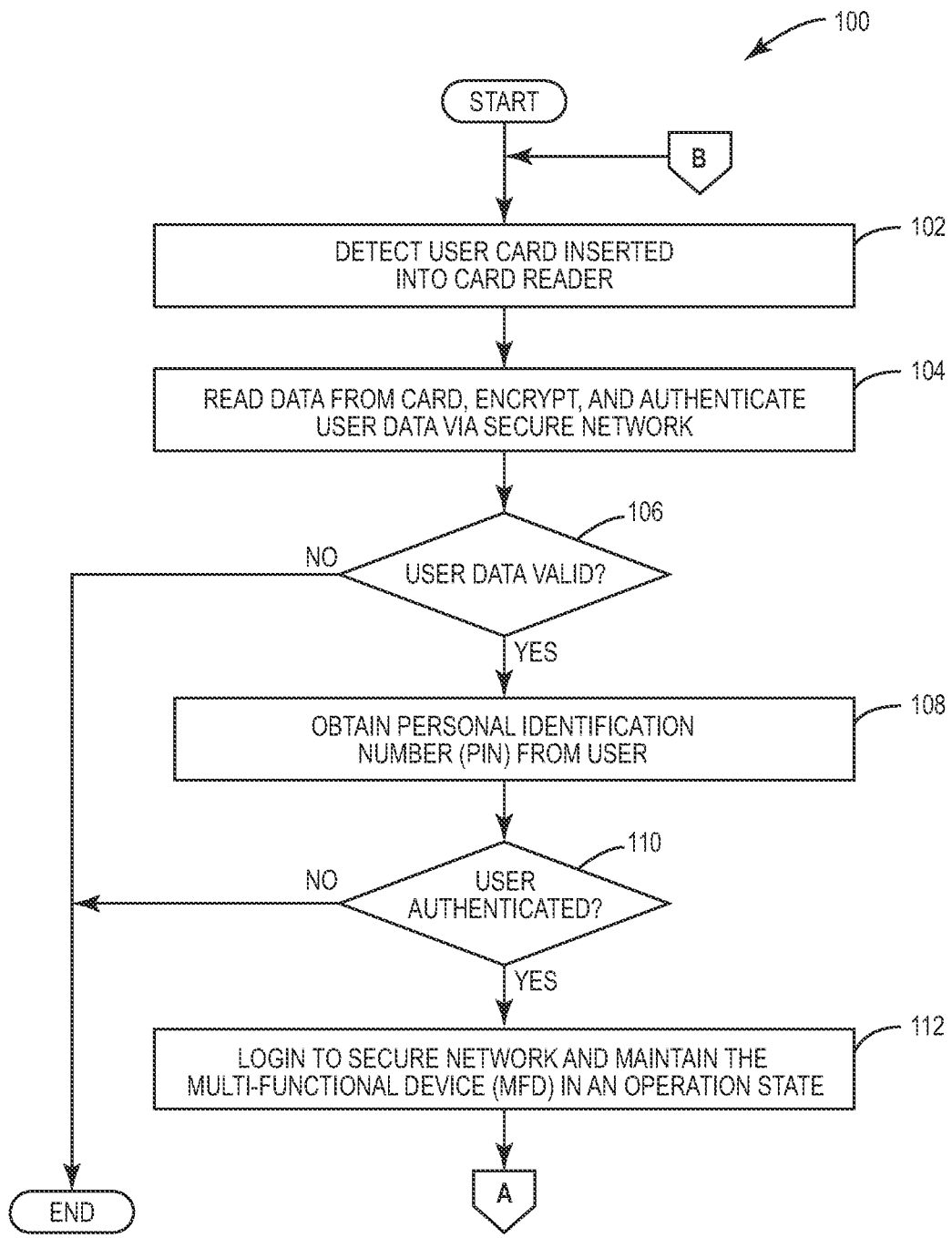
FIGS. 4A-4B are flow diagrams illustrating a method of authenticating a user over a secure network to utilize an MFD connected to the soft network according to one embodiment.
Figure 4B:
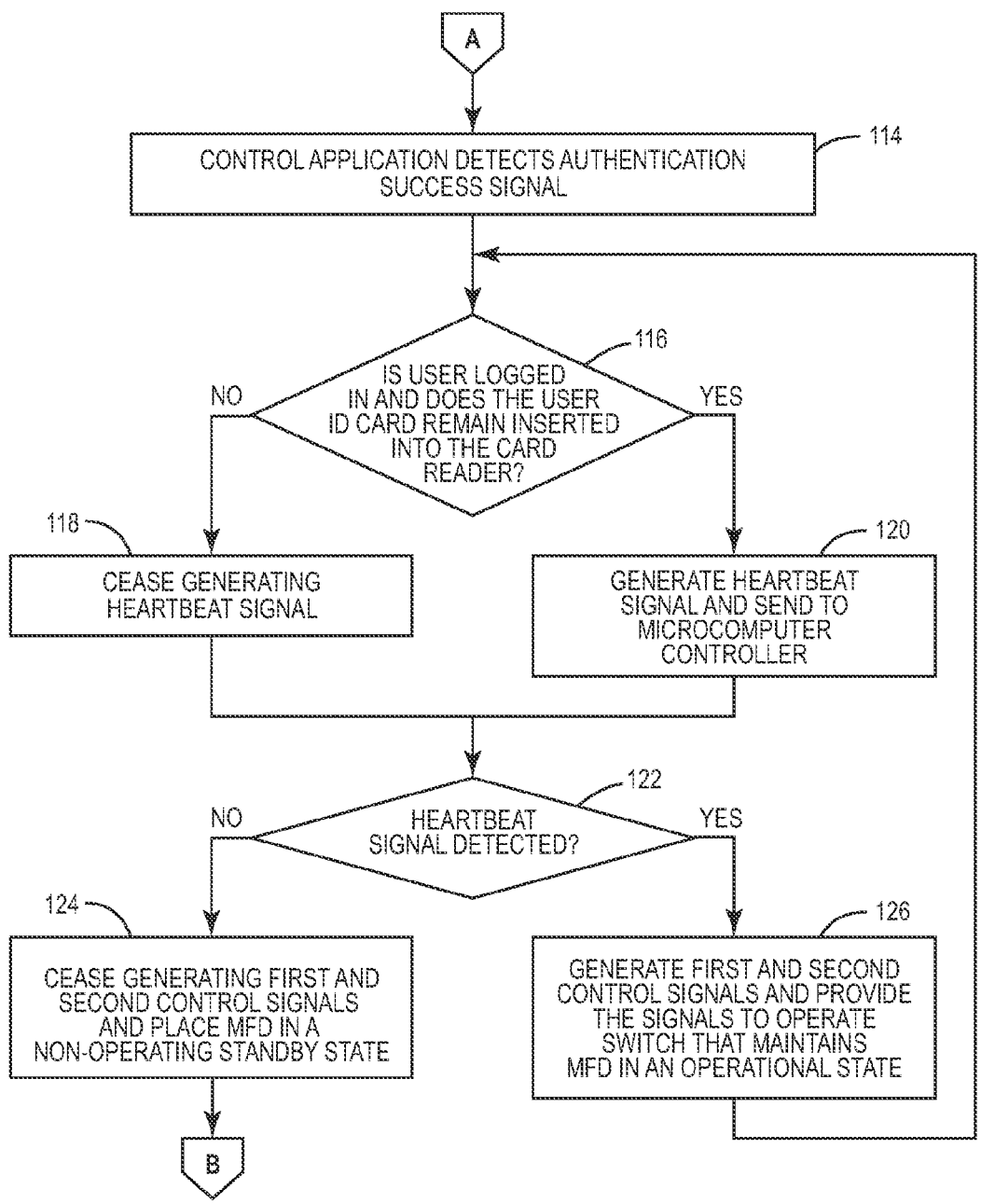

FIGS. 4A-4B are flow diagrams illustrating a method 100 of the present disclosure at the MFD 20. Those of ordinary skill in the art will readily appreciate that other methods are also possible, and that the method 100 is but one embodiment.

Method 100 begins with a user inserting his/her card medium into the card reader 32 (box 102). The card reader 32 reads the encoded credentials from the magnetic strip on the card, and sends the encoded credentials to the login application 38 executing on computing device 34. The computing device 34 may then encrypt the received credentials and send the encrypted credentials to secure server 90 via IP network 12 (box 104). As stated above, the secure server 90 will determine whether the user's credentials are valid, and send the result of that check back to the computing device 34. If the indication reveals that the user's credentials are not valid (box 106), method 100 ends. However, if the indication reveals that the user's credentials are valid (box 106), the login application 38 obtains the user's PIN (box 108). For example, the card reader 32 may include a keypad in which the user can enter his/her PIN. Alternatively, the login application 38 may read the user's PIN from a keypad displayed on the computing device 34. Regardless of how the user enters the PIN, however, the computing device 34 will send that PIN to the secure server 90 to be authenticated (box 110). If the PIN is invalid, the user is not authenticated and the method 100 ends. Provided both the user's credentials and the user's PIN are valid, however, the user is considered authorized and is logged into the secure network. In this state, the MFD 20 is activated and maintained in an operational status, but only for the authorized user (box 112).

The control application 40 detects the authentication success signal (FIG. 4B-box 114), as previously described, and begins generating the heartbeat signal for delivery to the access control circuitry 70. Particularly, the control application 40 detects that the user remains logged into the secure network, and monitors the card reader 32 to detect whether the user's card remains inserted (box 116). Such detection may comprise, for example, receiving an indication from the card reader 32 when the user removes the card medium, or detecting a change in a signal generated while the card remains inserted into the card reader 32. If the control application 40 detects that the user removes the card medium, or that the user has logged out of the secure network, the control application 40 will cease to generate the heartbeat signal (box 118). Otherwise, control application 40 generates the heartbeat signal and sends the heartbeat signal to the access control circuitry 70 of microcomputer 62 (box 120).

As stated previously, if the access control circuitry 70 ceases to detect the heartbeat signal (box 122), the access control circuitry 70 will cease generating one or both of the first and second signals thereby causing the switch 76 to move to an open position. In this position, the access control circuitry 70 no longer supplies a control signal CS to the MFD controller 82 thereby disabling the MFD 20 and placing the MFD 20 in an inactive mode (box 124). In the inactive mode, no users are able to access the functions of the MFD 20, and the method flow returns to the login application detecting the insertion of a card medium into the card reader 32.

However, so long as the access control circuitry 70 continues to detect the heartbeat signal from control application 40 (box 122), the access control circuitry 70 will continue to generate the first and second signals to close the switch 76 and maintain the switch 76 in the closed position. With switch 76 in the closed position, access control circuitry 70 continues to provide the control signal CS to the MFD controller 82, thereby maintaining the MFD 20 in an active mode so that the authorized user can access the functions of MFD 20 (box 126). Thereafter, the method flow returns to ensuring that the user is logged in and that the user's card remains inserted into the card reader (box 116), and the method is repeated.

Figure 5A:
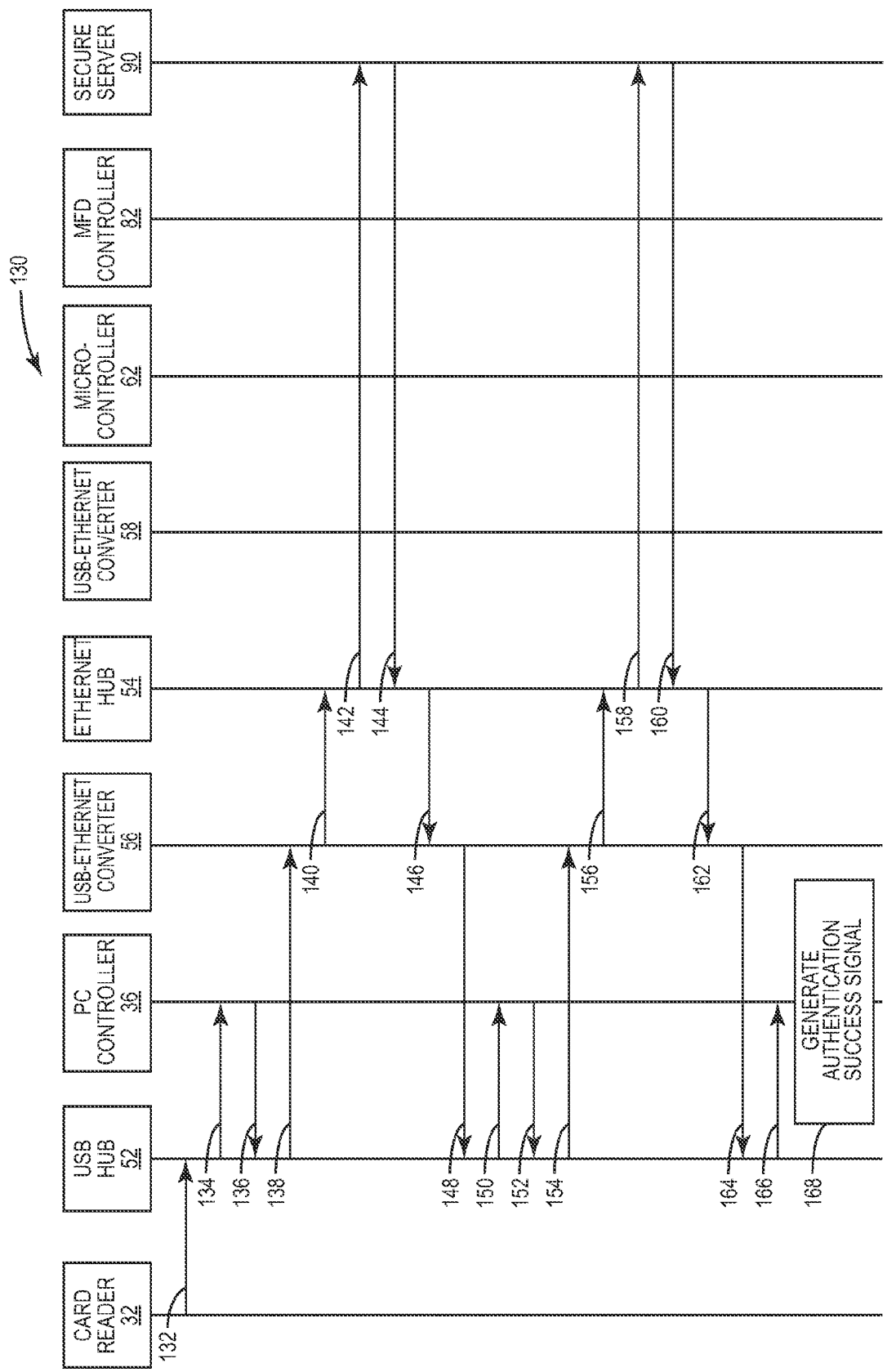
FIGS. 5A-5B are signaling diagrams illustrating how some of the system components communicate with each other to authenticate a user according to one embodiment.
Figure 5B:
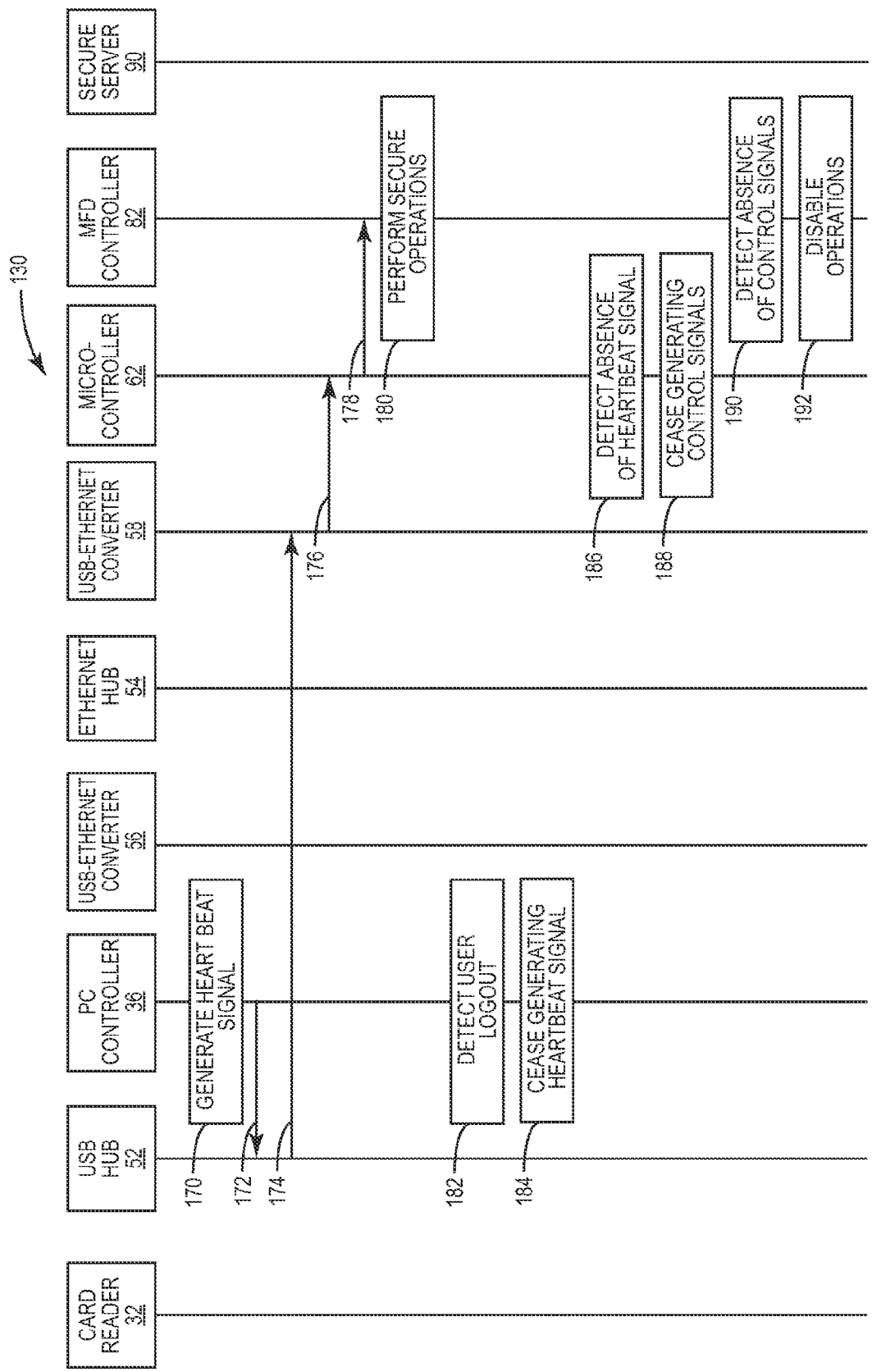

FIGS. 5A-5B are signal diagrams that illustrate the flow 130 of data and signals between each of the components of MFD 20 according to one or more embodiments of the present disclosure. As seen in FIG. 5A, signal flow 130 begins with the card reader 32 providing the user credentials read from the user's card medium to controller 36 via USB Hub 52 (lines 132, 134). The controller 36 then sends those credentials, possibly encrypted, if desired, to the secure server 90. Particularly, the controller 36 sends the credentials to the USB-Ethernet converter 56 via USB Hub 52 (lines 136, 138). The USB-Ethernet converter 56 then converts the credentials from the USB protocol to the Ethernet protocol and forwards the converted credentials to the secure server 90 via the Ethernet Hub 54 and communications interface 60 (lines 140, 142). The secure server 90 returns an indication of whether the user's credentials are valid to the USB-Ethernet converter 56 via the Ethernet Hub 54 (lines 144, 146). The USB-Ethernet converter 56 then converts the received indication from the Ethernet protocol to the USB protocol, and returns the indication to controller 36 via USB Hub 52 (lines 148, 150).

Provided the user's credentials are valid, controller 36 obtains the user's PIN, as previously stated, and sends that PIN to the USB-Ethernet converter 56 via USB Hub 52 (lines 152, 154). As above, the PIN information is converted from a USB format into an Ethernet format and forwarded to secure server 90 via the Ethernet Hub 54 (lines 156, 158). The secure server 90 then returns an indication of success, or failure, to the USB-Ethernet converter 56 via Ethernet Hub 54 (lines 160, 162). After converting the received indication from the Ethernet protocol to USB protocol, the USB-Ethernet converter 56 provides the indication to controller 36 via USB Hub 52 (lines 164, 166).

Provided the user is authenticated, the login application 38 executed by controller 36 generates an authentication success signal (box 168). Upon detecting that signal, the control application 40 executed by controller 36 begins generating the heartbeat signal (box 170). The control application 40 then continuously provides the heartbeat signal to the access control circuitry 70 at microcomputing device 62 via the USB Hub 52 and USB-Ethernet converter 58 (lines 172, 174, 176). Upon receipt of the heartbeat signal, the access control circuitry 70 generates the control signal CS, as previously described, and sends that signal to the MFD controller 82 (line 178). The user is then free to utilize the functions of the MFD 20 even though the MFD 20 is positioned in an unsecure or unrestricted area (box 180).

Operations continue until the controller 36 detects that the user has either logged out of the network, or removed the card medium from the card reader 32 (box 182). In response, the controller 36 will cease generating the heartbeat signal (box 184). The access control circuitry 70, upon detecting the absence of the heartbeat signal for some predetermined time period (box 816), ceases generating the control signal CS (box 188). The MFD controller 82, in turn, detects the absence of the control signal (box 190) and disables the MFD 20 (box 192) so that it cannot be used by another user until that user has been authorized.

In addition to activating and deactivating the MFD 20 for authorized users, the control device 50 is also configured to facilitate securely updating one or both of the computing device 34 and the MFD 20. For example, one or both of these devices generally comprise security software applications, middleware, firmware, and as stated above, the same, or a different, OS. Each of these software entities, from time to time, requires updates to address bugs, provide fixes, and enhance security, for example. In one embodiment, the present disclosure provides a system and method for pushing such updates from a network server to one or both of the computing device 34 and MFD 20, and applying the updates to those devices without affecting or re-writing code as is necessary without separate systems.

To accomplish this aspect, one embodiment of the present disclosure assigns each of the MFD 20 and the computing device 34 a unique destination IP address. Particularly, a first destination IP address is associated with the MFD 20. All traffic and data intended for the MFD 20 may be sent to the MFD 20 via this first destination IP address. A second, different destination IP address is associated with the OS executing on the computing device 34. The traffic and data intended for the computing device 34 is sent to the computing device 34 via the second destination IP address. One or both of the destination IP addresses may be assigned an "alias" or name so as to define the destination IP address using that name rather than an IP address.

As seen previously, both the computing device 34 and the MFD 20 are communicatively connected to the Ethernet hub 54. Upon receipt of a given update, which may be pushed to the control device 50 from secure server 90, for example, the Ethernet hub 54 routes the update to whichever device 34 or 20 is identified by the destination IP address that is associated with the received update.

The ability to send software/firmware updates according to the present disclosure provides an advantage not available with conventional systems. More specifically, conventional systems require a controlled, locked environment for the MFD 20 to perform such updates. The same would be true for updating the software/firmware associated with the computing device 34. With the control device 50 of the present embodiments, however, neither the MFD 20 nor the computing device 34 need be kept in a secure, controlled environment.

Figure 6:
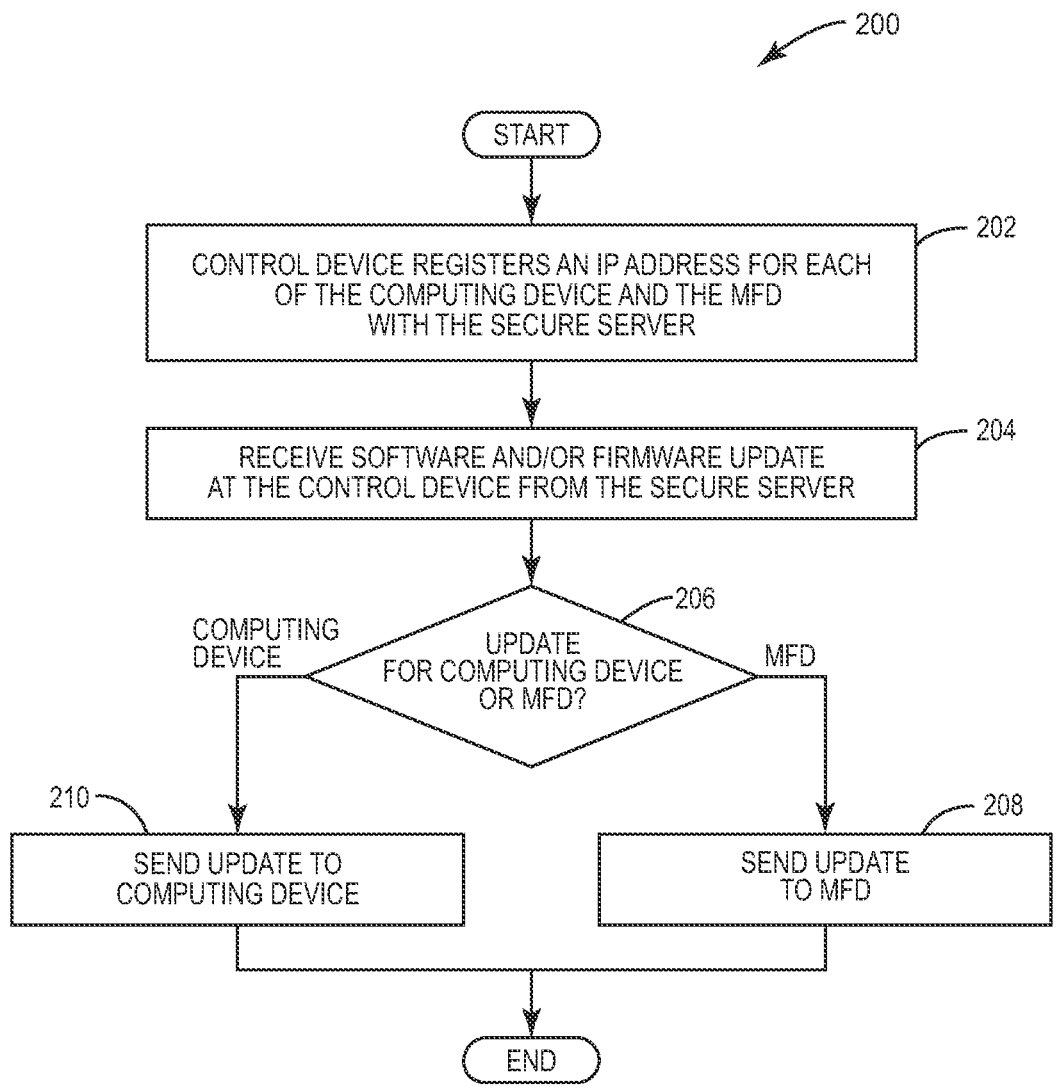
FIG. 6 is a flow diagram illustrating a method of updating software and/or firmware of a multi-functional device over a secure network according to one embodiment of the present disclosure.

FIG. 6 is a flow diagram illustrating a method 200 for updating the software and/or firmware executing on one or both of the MFD 20 and computing device 34. As seen in FIG. 6, method 200 begins with the control device 50 registering a unique IP address for each of the MFD 20 and the computing device 34 with secure server 90 (box 202). Those of ordinary skill in the art should realize that the registration may be accomplished using any known means; however in one embodiment, the device operators assign the IP addresses to each device 20, 34. Thereafter, each device 20, 34 broadcasts its unique destination IP address to other devices.

Once the devices 20, 34 have been registered, the control device 50 can receive updates for the software and/or firmware at one or both of the MFD 20 and computing device 34 (box 204) from time-to-time. Each received update identifies the destination IP address, or alias, for whichever device 20, 34, the update is intended. For example, the destination IP address may be extracted from the header of an incoming message associated with the update. If the received update is addressed to the first or primary destination IP address (box 206), the update is routed to the MFD controller 82 for execution on the MFD 20 (box 208). If the received update is addressed to the secondary destination IP address, however (box 206), the update is routed to the programmable controller 36 at computing device 34 (box 210). Updates or other data packets associated with unknown destination IP addresses are simply dropped and not executed on any of the controllers 36, 70, and 82.

Figure 7:
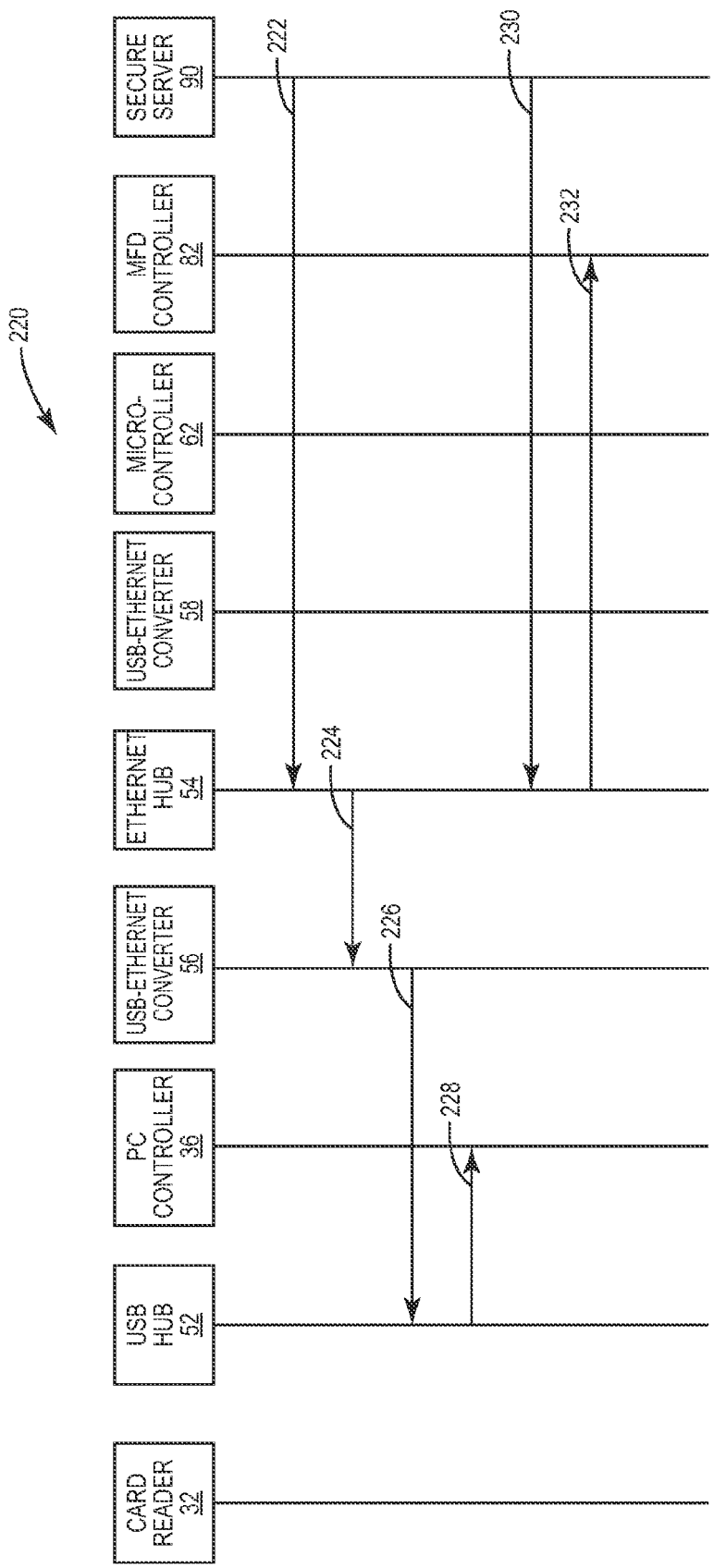
FIG. 7 is a signaling diagram illustrating how some of the system components communicate with each other to securely update software and/or firmware on the multi-functional device according to one embodiment of the present disclosure.
Figure 8:
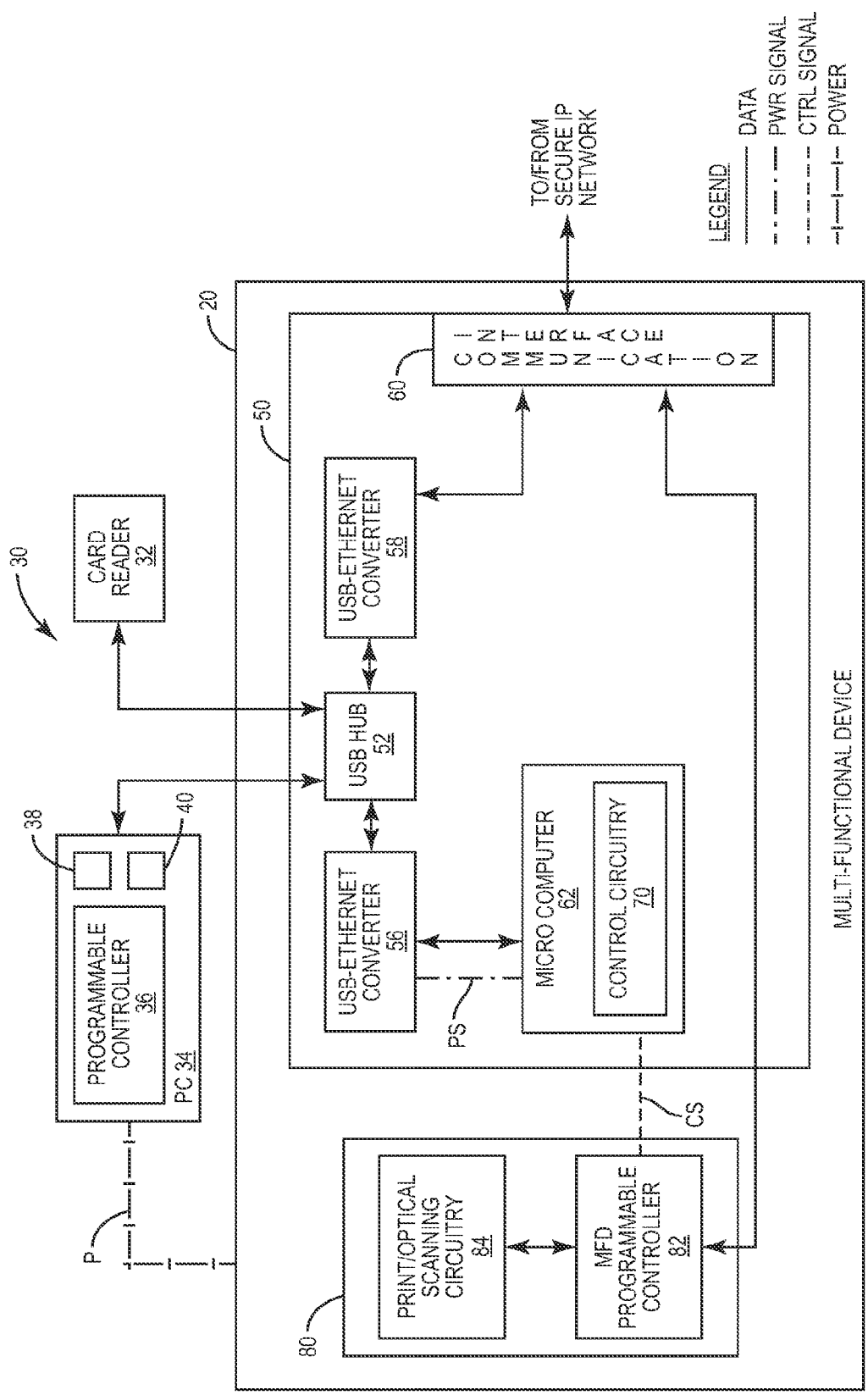
FIG. 8 is a block diagram illustrating an MFD configured according to another embodiment of the present disclosure.

FIG. 7 is a signal diagram illustrating the flow 220 of data and signals between each of the components of MFD 20 when updating the MFD 20 and the computing device 34 according to one or more embodiments of the present disclosure. As seen in FIG. 8, the secure server 90 sends a software and/or firmware update to the Ethernet hub 54 via secure IP network 12 and communications interface 60 (line 222). In this case, the received destination IP address identifies the update as being for the computing device 34. Thus, upon receipt, the Ethernet hub 54 forwards the update, which may be encrypted as needed or desired, to USB-Ethernet converter 54 (line 224). The USB-Ethernet converter 54 converts the data from the Ethernet protocol to the USB protocol and forwards the converted update to the programmable controller 36 at computing device 34 (line 228). Upon receipt, controller 36 can install the update.

Updating the software and/or firmware on MFD 20 is similar. Particularly, the secure server 90 sends the update, which may or may not be encrypted, to the control device 50 via secure IP network 12 and communications interface 60 (line 230). Upon receipt, the Ethernet hub 54 forwards the update to the MFD controller 82 for execution (box 234). Because both the MFD controller 82 and the Ethernet hub 54 communicate via Ethernet, there is no need for conversion as there is with updates destined for the programmable controller 36. Thus, the programmable controller 36 at computing device 34 can execute the received update upon receipt of the update.

The previous embodiments utilize the Ethernet hub 54 to receive update messages and route those messages, as appropriate, to the MFD controller 82 and the programmable controller 36 of computing device 34. However, it should be noted that the Ethernet hub 54 may not be present in all embodiments. For example, FIG. 8 is a block diagram illustrating MFD 20 configured according to another embodiment of the present disclosure. The components seen in FIG. 8 are substantially similar to those seen in FIG. 2 above. However, in this embodiment, the controller 50 does not comprise Ethernet Hub 54. Rather, the components of controller 50, the processing circuit 82, and the computing device 34 each communicate directly with the secure server 90 via communication interface 60 to receive the updates.

In addition to the foregoing embodiments, the access control circuitry 70 may also be configured to perform other functions. By way of example only, the access control circuitry 70 may be configured to generate a log entry for each user that utilizes MFD 20 to print, scan, or copy a document, and store those entries in a log file. Thus, each time an authorized user accesses the MFD 20, a log entry is generated and saved to a memory at MFD 20.

In another embodiment, the system facilitates redundant security measures to enhance security whenever a user posts print jobs from their desktop or work station to the MFD 20. More specifically, users currently may send jobs to a secure print file on the MFD 20. To retrieve the print file, the user may utilize an access code assigned at their desktop by the print drivers for the print job, for example. However if this access code was compromised, the MFD could be accessed by unauthorized personnel. Thus, any printouts may possibly be retrieved before the user could get to the printer. However, with the additional authentication processes detailed above, such unauthorized accesses are greatly reduced.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of activating a secure device to perform secure functions, the method performed at the secure device and comprising:
   authorizing a user to use a secure device, wherein authorization is based on data input by the user, and on encoded user credentials read from an authentication medium of the user and removably coupled to the secure device;
   if the user is authorized to use the secure device:
      generating a heartbeat signal while the authentication medium remains coupled to the secure device;
      generating a control signal while the heartbeat signal continues to be generated;
      switching the secure device into an active mode responsive to detecting the control signal to allow the user to use the secure device; and
      switching the secure device into an inactive mode responsive to detecting that the control signal is no longer being generated to prevent the user from using of the secure device.

2. The method of claim 1 further comprising sending the heartbeat signal at predetermined intervals to an access control circuitry of the secure device, and wherein generating a control signal while the heartbeat signal continues to be generated comprises generating the control signal at the access control circuitry while the access control circuitry continues to receive the heartbeat signal at the predetermined intervals.

3. The method of claim 2 further comprising sending the control signal from the access control circuitry to a processing circuit of the secure device, wherein the processing circuit and the access control circuitry are different circuits.

4. The method of claim 1 further comprising maintaining the secure device in the active mode while the access control circuitry continues to generate the control signal.

5. The method of claim 1 further comprising:
   ceasing to generate the heartbeat signal responsive to detecting that the authentication medium has been uncoupled from the secure device; and
   ceasing to generate the control signal responsive to detecting that the heartbeat signal is no longer being generated.

6. The method of claim 1 wherein generating a control signal while the heartbeat signal continues to be generated comprises:
   generating first and second voltages while the heartbeat signal continues to be generated; and
   outputting combined first and second voltages from the switch as the control signal.

7. The method of claim 6 further comprising ceasing to generate one or both of the first and second voltages to cease generating the control signal.

8. The method of claim 1 further comprising:
   registering, with a network server, a corresponding address for each of a first and second processing circuit of the secure device;
   receiving a software update from the network sever, wherein the software update comprises a destination address that corresponds to one of the first and second processing circuits; and
   routing the software update to either the first processing circuit or the second processing circuit based on the destination address.

9. A secure device configured to perform a plurality of secure functions for authorized users, the secure device comprising:
   an input/output (I/O) assembly comprising:
      a reader configured to releasably receive a user's authorization medium having user credentials encoded thereon; and
      a programmable control circuit configured to generate a heartbeat signal while the authentication medium remains coupled to the reader; and
   an access control device operatively connected to the I/O assembly and comprising:
      an access control circuitry configured to generate a control signal while the programmable control circuit continues to generate the heartbeat signal; and
      a processor circuit operatively connected to the access control circuitry and configured to:
         switch the secure device into an active mode responsive to receiving the control signal from the access control circuitry; and
         switch the secure device into an inactive mode responsive to detecting that the access control circuitry has ceased generating the control signal.

10. The secure device of claim 9 wherein the programmable control circuit is further configured to send the heartbeat signal to the access control circuitry at predetermined intervals.

11. The secure device of claim 9 wherein the programmable control circuit, the access control circuitry, and the processing circuit are different circuits.

12. The secure device of claim 9 wherein the programmable control circuit is further configured to maintain the secure device in the active mode while the access control circuitry continues to generate the control signal.

13. The secure device of claim 9 wherein the programmable control circuit is further configured to cease generating the heartbeat signal responsive to detecting that the authentication medium has been removed from the reader, and wherein the access control circuitry is further configured to cease generating the control signal when the programmable control circuit has ceased generating the heartbeat signal.

14. The secure device of claim 9 wherein to generate the control signal, the access control circuitry is configured to:
   generate first and second voltages while the heartbeat signal continues to be received; and
   output combined first and second voltages from the switch as the control signal to the processor circuit.

15. The secure device of claim 14 wherein to cease generating the control signal, the access control circuitry is further configured to cease generating one or both of the first and second voltages.

16. The secure device of claim 9 wherein the programmable control circuit is associated with a first Operating System (OS), and wherein the access control circuitry is associated with a second OS different from the first OS.

* * * * *